Nov. 7, 1961     J. ROSÁN     3,007,660
SHOCK ISOLATING SUPPORT

Filed Oct. 27, 1958     3 Sheets-Sheet 1

José Rosán
INVENTOR.

BY
C. Lauren Maloby
ATTORNEY

Nov. 7, 1961  J. ROSÁN  3,007,660
SHOCK ISOLATING SUPPORT
Filed Oct. 27, 1958  3 Sheets-Sheet 2

José Rosán
INVENTOR.

BY
ATTORNEY

Nov. 7, 1961 J. ROSÁN 3,007,660
SHOCK ISOLATING SUPPORT
Filed Oct. 27, 1958 3 Sheets-Sheet 3

José Rosán
INVENTOR.

BY
ATTORNEY

3,007,660
SHOCK ISOLATING SUPPORT

José Rosán, Newport Beach, Calif., assignor to Rosan Engineering Corporation, Newport Beach, Calif., a corporation of California
Filed Oct. 27, 1958, Ser. No. 769,804
7 Claims. (Cl. 248—20)

This invention relates to supporting structures and more especially to a shock isolating support or mounting for structures of wide variety.

An object of the invention is to provide a simple, practical and inexpensive shock isolating support of the character described.

Another object of the invention is to provide a novel shock isolating supporting adapted for resisting normal shock and vibration and also capable of withstanding unusual shock.

Another object of the invention is to provide an improved shock isolating support adapted to function in extremes of temperature, both high and low.

A further object of the invention is to provide a shock isolating support that has few parts and is extremely rugged and capable of functioning for long periods of time. Other objects and advantages will appear and be brought out more fully in the following specification, reference being had to the accompanying drawing wherein.

Figure 2:
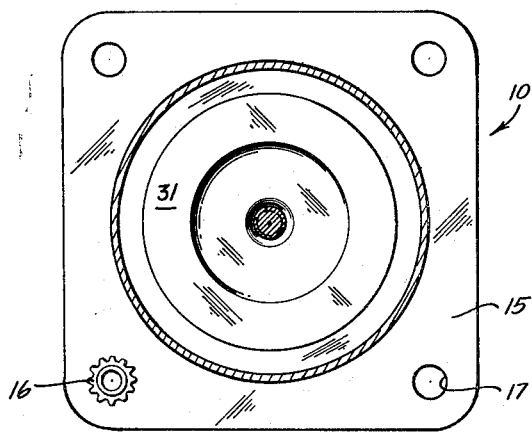
FIGURE 2 is a sectional view taken along the line 2—2 of FIGURE 1.
Figure 3:
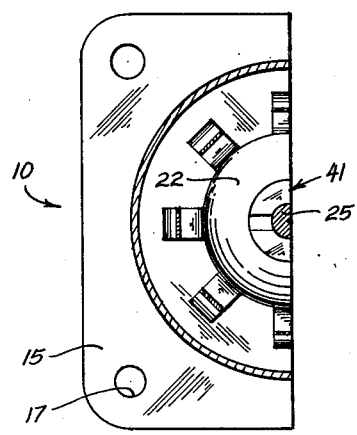
FIGURE 3 is a partial sectional view taken along the line 3—3 of FIGURE 1.
Figure 1:
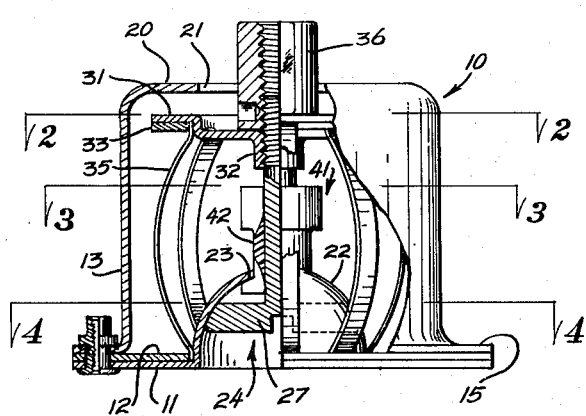
FIGURE 1 is an elevation view, partly in section, of a shock isolating support embodying the invention.
Figure 4:
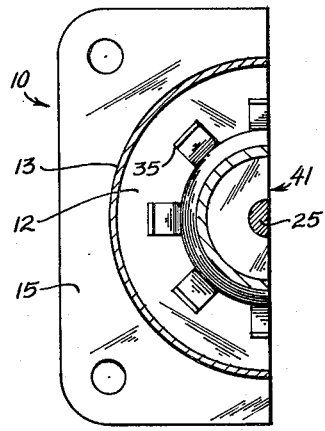
FIGURE 4 is a partial sectional view taken along the line 4—4 of FIGURE 1.
Figure 8:
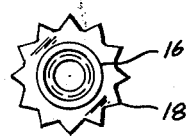
FIGURE 8 is a top view of one of the base fastener members.
Figure 9:
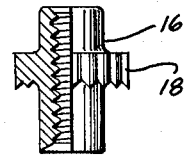
FIGURE 9 is a side view, in quarter section, of the same.

Referring particularly to the drawings and especially to FIGURES 1 to 4, the shock isolating support of this invention comprises a frame indicated generally at 10, having a base comprised of a plate 11, a bow spring retainer plate 12 and a housing 13 which is generally cylindrical in form and has a base flange 15. The elements of the frame assembly are secured together by a plurality of fasteners 16 which are generally tubular in form for insertion through aligned apertures 17 in the base elements and housing flange 15, the fasteners 16 being upset at their lower ends, as seen in FIGURE 1, and formed with serrated toothed flanges 18 (FIGS. 8 and 9) to resist rotation by securing screws run through the threaded bores of the fasteners 16. Housing 13 has a top 20 formed with a large central opening 21 through which the hereinafter described fastener member extends.

Figure 10:
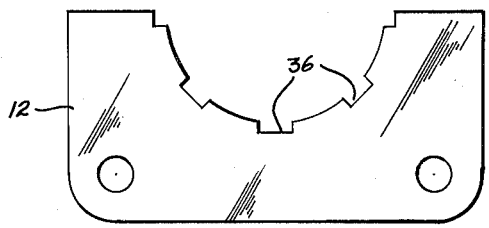
FIGURE 10 is a partial face view of one of the spring retaining plates seen in FIGURES 1 and 4.
Figure 11:
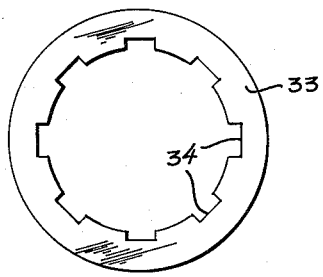
FIGURE 11 is a face view of another of the spring retaining plates seen in FIGURE 1.
Figure 12:
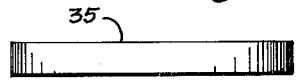
FIGURE 12 is a side view of one of the bow springs seen in FIGURES 1, 3 and 4.
Figure 13:
FIGURE 13 is a side view of the same.
Figure 17:
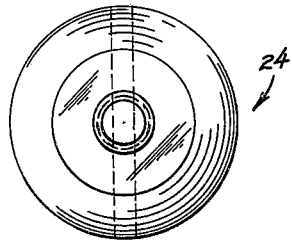
FIGURE 17 is an end view of the fastener member seen in FIGURE 1.
Figure 18:
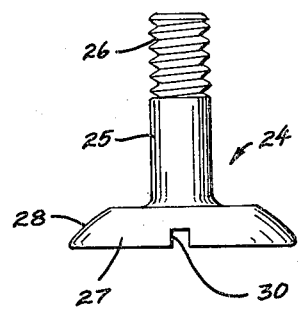
FIGURE 18 is a side view of the same.

Base plate 11 has a dome shaped raised central portion 22 formed with a central aperture 23 which is aligned with aperture 21. A fastener member 24 (FIGURES 17 and 18) has a shank 25, a threaded end 26 and a head 27 in the form of a flange larger than aperture 23, the periphery of the flange being beveled with a spherical curved contour corresponding to the curve of dome 22. Head 27 is formed with a slot 30 or other formation to receive an appropriate torquing tool. A horizontal plate 31 has a central apertured raised portion having an internally threaded hub 32 and is secured on threaded end 26 of fastener member 24. A ring 33 is suitably secured, as by welding, to the under side of plate 31 and is formed with a plurality of notches 34 (FIG. 11) to receive and position the upper ends of a plurality of bow springs 35 (FIGS. 12 and 13), the lower ends of which are similarly secured in notches 36 (FIG. 10) of plate 12 which has a central opening through which dome 22 extends.

Figure 5:
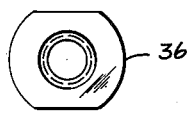
FIGURE 5 is the top view of the fastener member seen in FIGURE 1.
Figure 6:
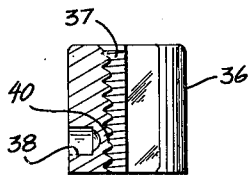
FIGURE 6 is a side view in quarter section of the same.
Figure 7:
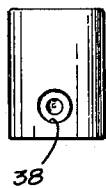
FIGURE 7 is another side view of the same.
Figure 14:
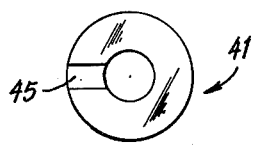
FIGURE 14 is an end view of the snubber collar seen in FIGURES 1 and 3.
Figure 15:
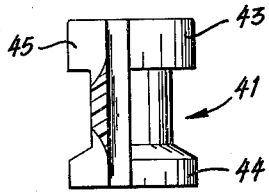
FIGURE 15 is a side view, in quarter section, of the same.
Figure 16:
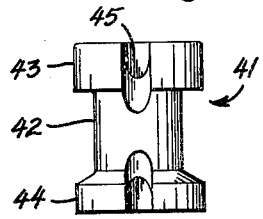
FIGURE 16 is another side view of the same.

A member 36 (FIGURES 5 to 7) has internal threads 37 mating with threads 26 and is run on the end of fastener member 24 to secure plate 31 thereon. Member 36 has a radial bore 38 for the reception of a tool adapted to form a thread lock dimple 40 in the internal threads 37 for locking member 36 on fastener member 24. A spool-shaped snubber collar 41 (FIGURES 14 to 16) is formed with a bore to fit snugly and frictionally on shank 25 of fastener member 24 and has a reduced central portion 42 which extends through aperture 23, thus forming upper and lower flanges 43 and 44 on opposite sides of opening 23 of dome 22. Snubber 41 is preferably formed of a nylon-like material which has a moderate degree of resiliency but has a desired characteristic of shock or impact absorbing quality. Collar 41 may be formed with longitudinal grooves 45, so formed as to permit flange 43 or 44 to be passed through aperture 23 when the parts are assembled.

The operation of the invention should be clear from the foregoing description. A machine or device to be supported is suitably secured to member 36 and, upon being subject to vibration or impact of normal character, the fastener assembly including member 24 and horizontal plate 31 will be resiliently carried by bow springs 35 which will bend as required. The apparatus can shift laterally, the limit of which shifting will be determined by the space between the margin of plate 31 and the wall of housing 13 which space is smaller than the space provided by the central opening 21. If the machine or apparatus should be subject to excessive vibration or impact, snubber 41 will limit the downward movement of the fastener assembly by the extent of reduced central portion 42 of the snubber. This snubber, although having a snug fit on shank 25, is nevertheless slideable thereon with a friction fit such as to counteract the natural frequency of vibration of springs 35 and thus dampen the natural period of oscillation thereof. Under some conditions a metallic snubber may be substituted for the plastic or nylon-like snubber 41.

What is claimed is:

1. A shock isolating support comprising, in combination: a frame including a base, a housing of generally cylindrical form, and a first spring retainer plate, said base having a raised central portion having an aperture therethrough, said spring retainer plate having a central opening with notches in the periphery thereof; means fastening said base, housing and first spring retainer plate together with said raised central portion extending through the central opening in said first spring retainer plate; a horizontal plate having a central apertured raised portion, a second spring retainer plate secured to said horizontal plate, said second spring retainer plate having a central notched aperture through which said latter apertured raised portion extends; means resiliently supporting said plate within said frame in spaced relation with said base, and means limiting vertical movement of said horizontal plate including a fastener member adapted to be secured to a device to be supported, there being space between the periphery of said horizontal plate and said housing permitting limited lateral movement of said horizontal plate, said first means comprising a circular array of substantially vertical bow springs, the ends of said bow springs engaging the notches in said first and said second spring retainer plates.

2. A shock isolating support comprising, in combination: a frame including a base having a raised central portion formed with an aperture, a horizontal plate, means resiliently supporting said plate within said frame in spaced relation with said base and raised central portion, there being a space between the periphery of said plate and said frame permitting limited lateral movement of said plate, and means limiting vertical movement of said plate including a fastener member connected and movable with said plate, said fastener member having a shank with a diameter smaller than said aperture and extending through said aperture and adapted to be secured to a device to be supported, said fastener member having a flanged head larger than said aperture, a spool-shaped collar surrounding said shank, said collar having a central cylindrical portion received within said aperture and end flanges adapted to engage opposite sides of said raised central portion when said plate is moved relative to said raised central portion.

3. A shock isolating support as defined in claim 2, in which said shank is threaded to matingly engage a threaded aperture in said horizontal plate.

4. A shock isolating support as defined in claim 2, in which said raised central portion is dome-shaped, and in which the head of said fastener member conforms to a surface of a sphere to provide a ball and socket joint with said raised central portion.

5. A shock isolating support as defined in claim 2, in which said collar frictionally engages said shank, said collar having an axial length to afford a clearance between an end flange and said horizontal plate when said resilient means is expanded, whereby movement of said horizontal plate past the point wherein said flange engages a wall of said raised central portion affords a snubbing action to further movement.

6. A shock isolating support comprising, in combination: a frame including a base having a raised central portion formed with an aperture, a horizontal plate, means resiliently supporting said plate within said frame, and means limiting vertical movement of said plate including a fastener member having a shank extending through said aperture and adapted to be secured to a device to be supported, said fastener member having a flanged head larger than said aperture, there being space between the periphery of said plate and said frame permitting limited lateral movement of said plate and a nylon-like snubber collar having a frictional mounting on said shank and a shoulder engageable with said base.

7. A shock isolating support comprising, in combination: a frame including a base having a dome-shaped raised central portion formed with an aperture; a horizontal plate; means resiliently supporting said plate within said frame; and means limiting vertical movement of said plate including a fastener member having a shank extending through said aperture and adapted to be secured to a device to be supported, said fastener having a flanged head larger than said aperture and the thickness of said shank being smaller than said aperture, there being a space between the periphery of said plate and same frame permitting limited lateral movement of said plate.

References Cited in the file of this patent

UNITED STATES PATENTS

| | | |
|---|---|---|
| 1,166,752 | Finizio | Jan. 4, 1916 |
| 2,172,004 | Anderson | Sept. 5, 1939 |
| 2,315,398 | Clark | Mar. 30, 1943 |
| 2,519,702 | Robinson | Aug. 22, 1950 |
| 2,716,011 | Steimen | Aug. 23, 1955 |